United States Patent [19]

Reinicke et al.

[11] Patent Number: 4,930,746
[45] Date of Patent: Jun. 5, 1990

[54] FLUID CONTROL DEVICE

[75] Inventors: Robert H. Reinicke, Mission Viejo; Jefferson Y. S. Yang, Orange, both of Calif.

[73] Assignee: Eaton Corporation, Cleveland, Ohio

[21] Appl. No.: 385,748

[22] Filed: Jul. 26, 1989

Related U.S. Application Data

[62] Division of Ser. No. 147,829, Jan. 25, 1988, Pat. No. 4,892,286.

[51] Int. Cl.$^5$ ............................................. F16K 31/10
[52] U.S. Cl. ........................... 251/129.11; 251/129.14; 251/252
[58] Field of Search .......... 251/129.2, 129.11, 129.21, 251/252, 129.12

[56] References Cited

U.S. PATENT DOCUMENTS

| 2,496,880 | 2/1950 | Leland . | |
| 3,780,980 | 12/1973 | Kallel | 251/129.2 |
| 4,452,423 | 6/1984 | Beblavi et al. | 251/65 |
| 4,723,754 | 2/1988 | Torimoto et al. | 251/129.05 |
| 4,735,233 | 4/1988 | Nogami et al. | 137/625.65 |

Primary Examiner—Arnold Rosenthal
Attorney, Agent, or Firm—L. G. Vande Zande

[57] ABSTRACT

A modulating valve fluid regulator utilizing a two pole brushless DC motor having the rotor mounted for axial and rotary movement. A poppet is directly carried by the rotor and lifted from the valve seat by a flexible band system which winds upon a mandrel upon rotation of the rotor, or by a cam system having ball bearing cam followers operating on an arcuate cam surface for maximizing torque. Magnetic fields of rotor permanent magnets reacting with the stator core close valve when no electrical power is present to motor.

1 Claim, 6 Drawing Sheets

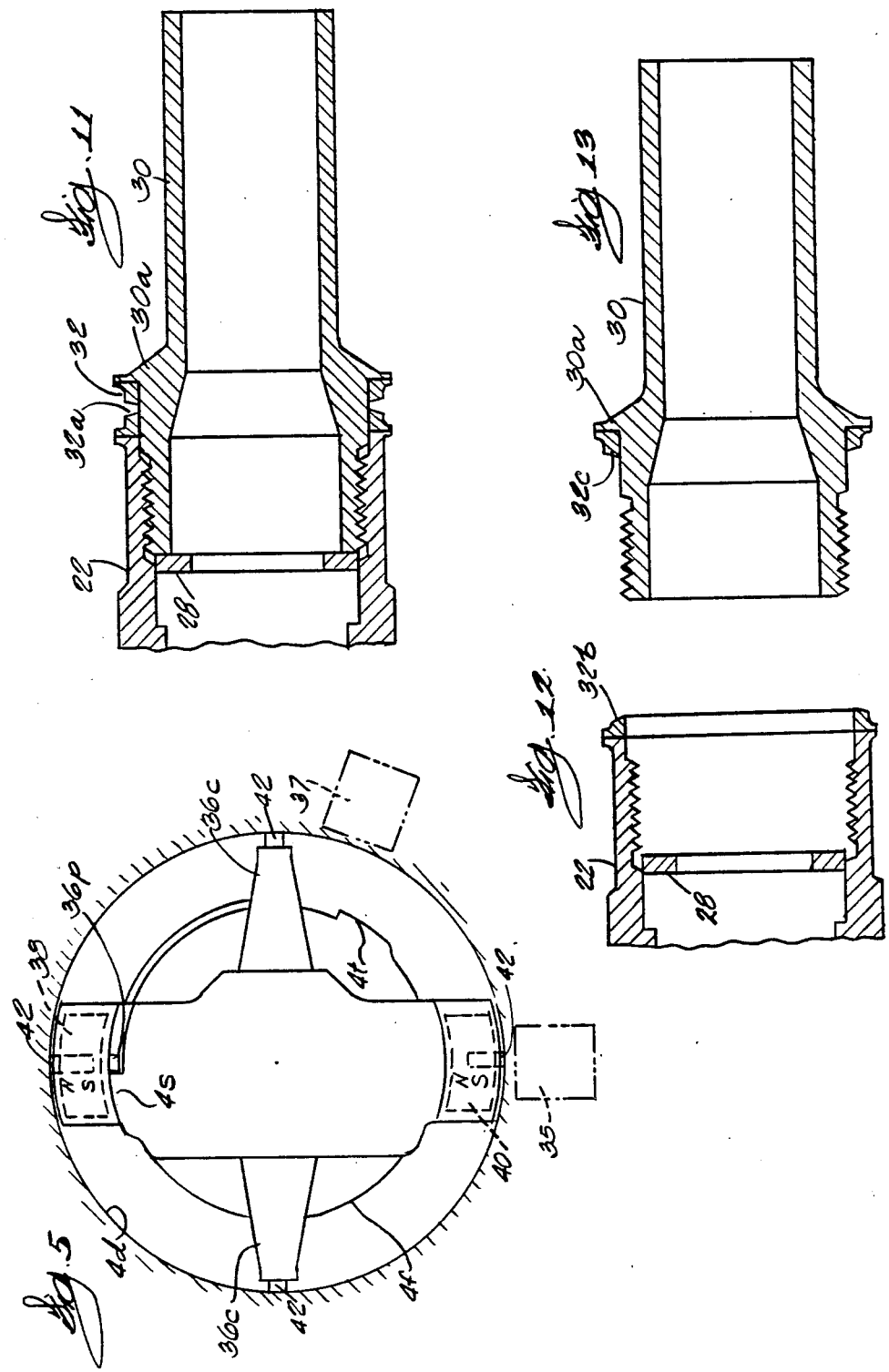

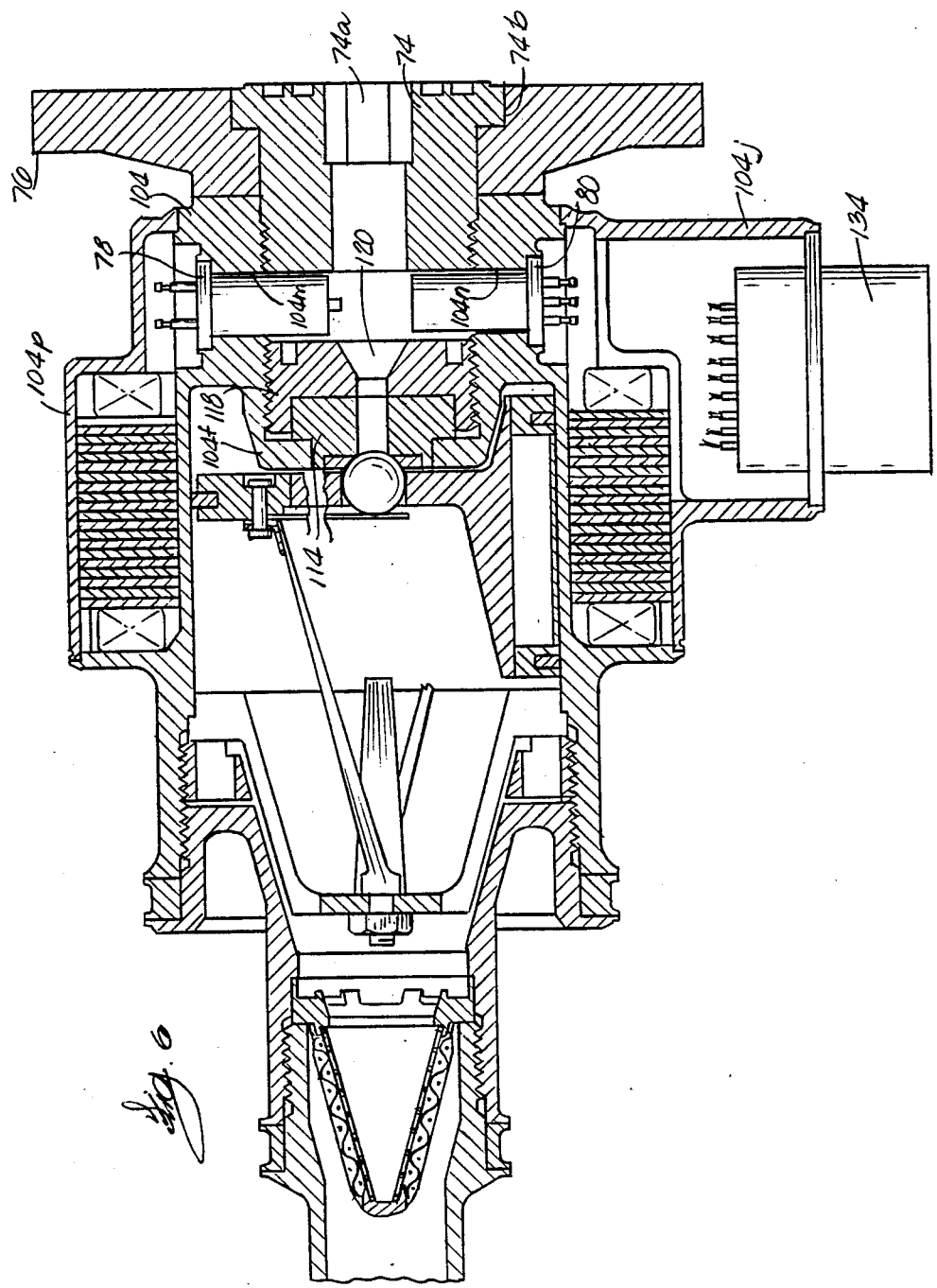

FLUID CONTROL DEVICE

This application is a division of copending application Ser. No. 07/147,829, filed Jan. 25, 1988 now U.S. Pat. No. 4,892,286, dated Jan. 9, 1990, in the name of Robert H. Reinicke et al for Fluid Control Device.

BACKGROUND OF THE INVENTION

This invention relates to fluid control devices, in particular valves, which are actuated by partial-revolution DC motors. More particularly, the invention relates to devices of the aforestated type which are electronically controlled to provide a modulating valve for regulating fluid conditions. Specifically, the invention relates to devices of the aforestated type utilizing a brushless DC motor in which the rotor is axially movable to directly carry the valve poppet, thereby providing a single stage fluid control device.

Fluid control devices of the type to which this invention is related employ a modulating valve to regulate fluids. Such devices may be used as shut-off valves, pressure regulators, mass flow rate regulators, volumetric flow rate regulators or pressure relief valves for fluids in liquid or gaseous form. The fluids may be corrosive and/or flammable in nature and therefore the fluid contacting portions of the valve structure must be corrosion resistant and must not provide an ignition source. It is preferable that such devices avoid small flow passages which are susceptible to clogging. Electronic controllers are employed which respond to command and feedback signals sensed by transducers to control a partial-revolution DC motor to regulate the valve opening. Present fluid control devices of this type are two stage devices wherein electrical energization of the motor operates a small pilot valve which in turn operates the main valve. The fluid passage for the pilot valve is considerably smaller than the main fluid passage and is susceptible to clogging. Additionally, the small pilot valve adds complexity to the design and requires dynamic seals. Moreover, the motor must be sealed from contact with the fluid and motion transmitting bellows are often employed for this purpose. The pilot valve two stage device often employs a main-stage bellows for operating the main valve, such bellows being sensitive to cycling and pressure levels.

This invention provides a fluid control device having several advantages over the presently available two stage systems. The fluid control device of this invention is a single stage device utilizing a two pole brushless DC motor wherein the rotor is mounted for rotational and axial movement within a cylindrical chamber of the housing by bearings projecting from the periphery of the rotor and slidingly engaging the interior surface of the valve chamber. The rotor integrally carries the poppet, thereby providing only a single moving unit within the device. With no electrical power applied, magnetic flux of permanent magnets of the rotor react with ferromagnetic material of the stator core to axially position the rotor and poppet in the valve closed position. By utilizing a brushless DC motor, contamination and potential for explosion due to electrical arcs from motor brushes are eliminated, and thus the rotor may be exposed to the fluid. The two pole brushless DC motor significantly simplifies the device by eliminating the need to commutate the stator windings, therefore also eliminating transducers such as Hall effect devices and associated circuitry to perform such commutation. Two embodiments of valve opening mechanisms are disclosed which may be constructed to provide variable "lift per revolution", or "lead". The electronic control employs a pulse width modulation driver to minimize self-heating in the motor and controller and to provide fast efficient response to varying conditions sensed by transducers, which may be integrally mounted within the device or mounted within the system.

SUMMARY OF THE INVENTION

This invention provides a fluid control device employing a valve actuated by a brushless DC motor having the valve poppet integral with an axially and rotatably movable rotor, thereby providing a single stage fluid control device. The motor is a two pole device controlled by a pulse width modulation driver which in turn is controlled by a microprocessor based electronic controller. The controller drives the rotor in either direction to provide a modulating valve, or fluid regulator. A first embodiment comprises a flexure system which winds upon a mandrel for effecting axial motion of the rotor in the valve opening direction. A second embodiment employs a cam and cam follower drive for effecting axial valve opening displacement of the rotor.

The advantages and features of this fluid control device will become apparent in the following description and claims when read in conjunction with the accompanying drawings.

BRIEF DESCRIPTION OF THE DRAWINGS

FIG. 5 is a fragmentary cross sectional view taken substantially along the line 5—5 in FIG. 3;

FIG. 6 is a cross sectional view similar to FIG. 3 of an alternative embodiment of the fluid control device of this invention;

FIG. 11 is a cross sectional view of two members of tho fluid control device of this invention showing a method of disassembling the members; and FIGS. 12 and 13 are cross sectional views of the members of FIG. 11 separated from each other.

DESCRIPTION OF THE PREFERRED EMBODIMENTS

Figure 1:
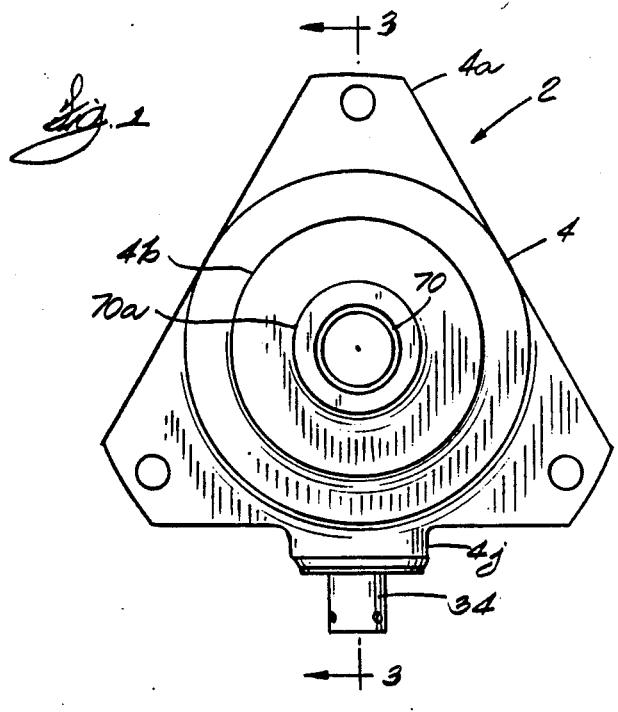
FIG. 1 is an end view of a fluid control device constructed in accordance with this invention.
Figure 2:
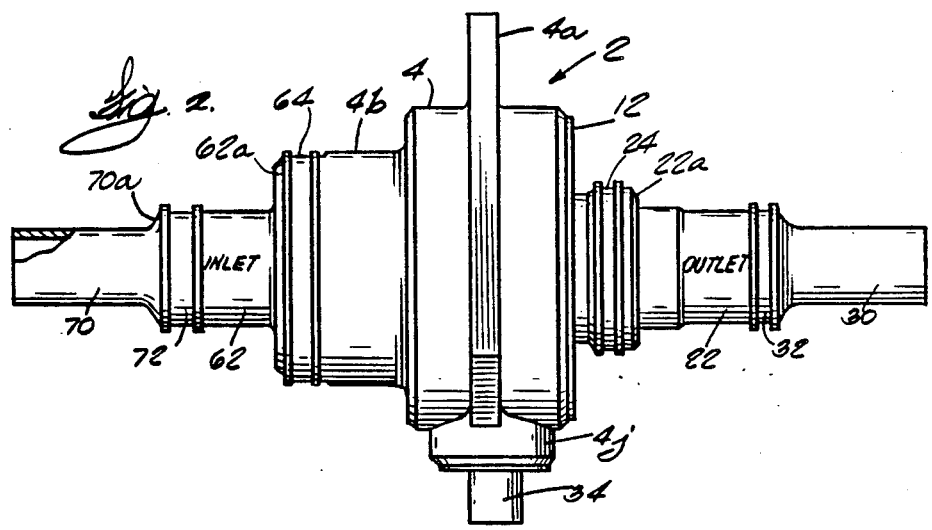
FIG. 2 is a side elevational view of the fluid control device shown in FIG. 1.

Referring to FIGS. 1-5 of the drawings, a fluid control device 2 constructed in accordance with this invention comprises a main cylindrically shaped housing 4 made of a high strength non-magnetic material such as titanium alloy Ti-6Al-4V. Housing 4 has a mounting flange 4a disposed to the main axis of the housing. A reduced diameter hub 4b projects leftward from the main body portion of housing 4 and has a large internally threaded opening 4c leading directly to an interior chamber 4d within the main body portion of housing 4. An annular cavity 4e opens to the right-hand end of housing 4 and surrounds the interior chamber 4d. A stator assembly of a partial-revolution brushless DC motor comprising a plurality of circular disc laminations 8 having transverse slots therein open to the inner diameter of the laminations 8, and a plurality of coils 10 wound across the assembled laminations within the slots is positioned within the cavity 4e. A disc-shaped closure 12 is positioned over a central hub of a right-hand end wall 4f of housing 4 to close off the opening of cavity 4e. Annular wells along the junctures of the inner and outer diameters of closure 12 with housing 4 seals the cavity 4e. The central hub of right-hand end wall 4f of housing 4 has an internally threaded cylindrical opening 4g open to the right-hand end of housing 4.

A shouldered cylindrical valve seat 14 is inserted into the right-hand opening 4g against the end wall 4f such that a reduced diameter hub of the valve seat extends through an opening 4h in end wall 4f. A seal 16 is disposed between valve seat 14 and housing end wall 4f. A nut 18 is threaded into opening 4g to secure valve seat 14 against end wall 4f, the nut 18 having a cylindrical recess for receiving the enlarged diameter end of valve seat 14. Valve seat 14 and nut 18 are provided with aligned central apertures which form an outlet passage 20 leading from the interior chamber 4d.

The opening 4g is closed off with an end cap 22 threadably received within the opening 4g. Before assembling end cap 22 to the housing 4, a spacer ring 24 is positioned over the threaded end to seat against the inner face of an annular flange 22a of end cap 22. The opposite face of spacer 24 seats against a right-hand end face of the central hub of end wall 4f. The respective junctures between spacer 24 and end wall 4f and flange 22a are welded along their annular length to seal the assembly. The significance of spacer 24 and other similar spacer rings which will appear in later description will be discussed in conjunction with FIGS. 11–13 later.

End cap 22 has a cylindrical opening extending throughout its length. This opening is enlarged near the midpoint of the end cap 22 to provide an annular shoulder 22b within the opening. A filter assembly 26 is inserted through the open right-hand end of end cap 22 into the enlarged diameter portion of the opening within the end cap 22 to seat against the shoulder 22b. A washer 28 is subsequently inserted within the opening to bear against the outer edge of the filter assembly 26. An outlet tube 30 is threaded into an internally threaded portion at the right-hand end of the opening in end cap 22 to bear against washer 28, thereby maintaining the filter assembly 26 firmly positioned against shoulder 22b. A spacer ring 32 is disposed over the threaded end of outlet tube 30 prior to threading the tube into end cap 22. Spacer 32 seats against an annular flange 30a formed on outlet tube 30 and against the right-hand end surface of end cap 22. When the tube 30 is firmly secured within end cap 22, the respective junctions between spacer 32 and end cap 22 and flange 30a are welded along their annular length to provide a sealed assembly.

A cylindrical boss 4j projects from the bottom of housing 4. Boss 4j has a cavity 4k open to the bottom surface thereof. An electrical connector assembly 34 is attached to the boss 4j over the open end thereof by welding or the like. Connector assembly 34 has wire connections leading to the windings 10 of the stator assembly through a small aperture interconnecting cavity 4k with cavity 4e. Connector 34 also has wire connections leading to a pair of Hall effect transducers 35 and 37 which are positioned within pockets formed in the rear wall of cavity 4e. Only one transducer 35 is visible in FIG. 4; the location of both transducers 35 and 37 is shown in FIG. 5.

Figure 3:
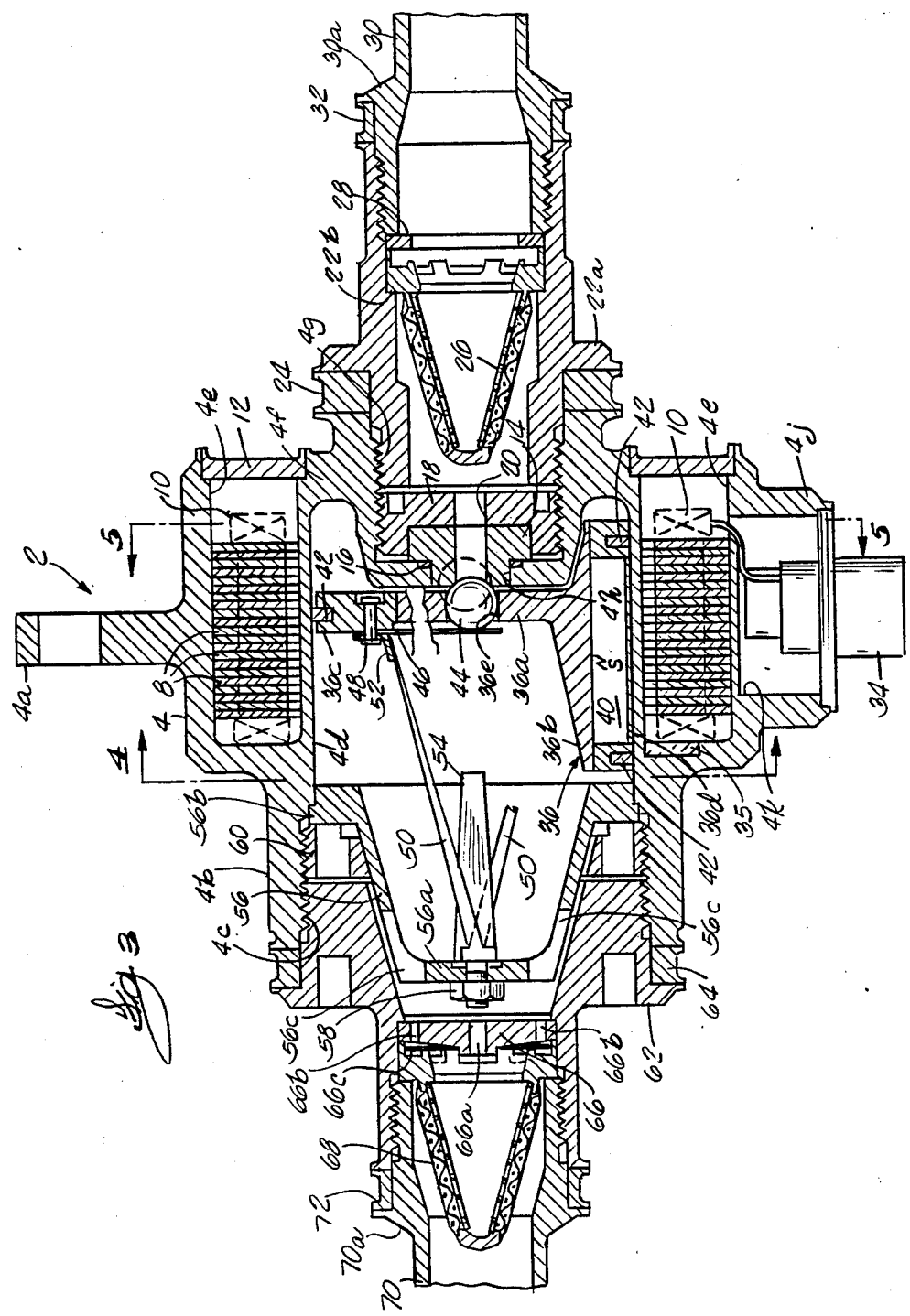
FIG. 3 is a cross sectional view of the fluid control device of this invention taken along the line 3—3 in FIG. 1.
Figure 4:
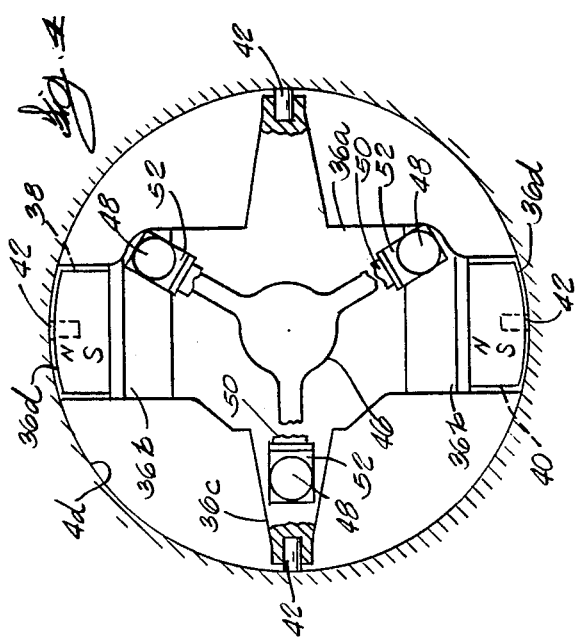
FIG. 4 is a fragmentary cross sectinal view taken substantially along the line 4—4 in FIG. 3.

An integrated regulator valve and motor rotor 36 is inserted into the interior chamber 4d through the end opening 4c in the left-hand end of housing 4. Referring to FIGS. 3, 4 and 5, the rotor 36 comprises a transverse wall 36a of magnetic material having a pair of leftwardly projecting magnet supports 36b disposed at its ends. In FIG. 3, only one support 36b is shown at the lower portion thereof. The upper portion of the rotor in FIG. 3 is a rotated section showing the structure of the rotor at the 270° interval as viewed in FIG. 4, or the structure is at right angles to the wall 36a. This structure at right angles to wall 36 comprises a pair of bearing support plates 36c welded to the sides of wall 36a at diametrically opposed intervals. A pair of permanent magnets 38 and 40 are affixed to the outer surfaces of magnet supports 36b, and each are provided with a thin cover 36d of non-magnetic material. Magnets 38 and 40 are arranged with their N and S poles in series, and the wall 36a serves as "back iron" for the assembly, completing the magnetic flux path between the two permanent magnets. The outer ends of cover 36d are relatively thick, disc shaped portions having holes therein at each end to receive TEFLON pins 42 which project beyond the peripheral surface of the cover. Additional TEFLON pins 42 are provided in holes at the extremity of plates 36c to project beyond the ends thereof. Pins 42 project from the surface of the rotor 36 to engage the smooth cylindrical inner surface of interior chamber 4d. Pins 42 position the rotor for rotation about its axis and permit linear axial movement within the interior chamber 4d. Other bearing structures, such as annular rings projecting from the surface of the rotor, may be used in place of pins 42.

The permanent magnets 38 and 40 are preferably made of rare earth material such as samarium cobalt or neodymium. The stator laminations are preferably formed of vanadium permendur, a product of Allegheny Ludlum Steel Corp. The rotor is axially positioned such that the permanent magnets 38 and 40 are offset slightly leftward with respect to the laminations 8 of the stator, causing the magnetic flux of the permanent magnets to react with the material of the laminations 8 to provide a magnetic force on the rotor in the rightward axial direction in the electrically de-energized condition of the motor.

Transverse wall or hub 36a of the rotor 36 is provided with a central aperture 36e. Aperture 36e is constricted at the right, or rear surface of wall 36a. A spherical poppet 44 is received within aperture 36e from the front or left-hand side of wall 36e and is prevented from passing completely through the aperture 36e by the constriction at the rear surface. A Y-shaped spring 46 is attached to the front or left-hand surface of wall 36e such that the central web joining the three legs of spring 46 overlies poppet 44 to bias the latter toward the constriction of aperture 36e. When in the the normal at rest position or deenergized position of the brushless DC motor, the flux of permanent magnets 38 and 40 react with laminations 8 as aforementioned to position the rotor axially such that poppet 44 seats on valve seat 14 to close off the outlet passage 20. The force provided by permanent magnets 38 and 40 is such to cause some deflection of spring 46 thereby to provide a spring bias to poppet 44 against valve seat 14.

The outer ends of springs 46 are attached to the transverse wall 36a and to the left-hand face of one of the plates 36c at three equally spaced points along the outer periphery of the rotor by rivets 48. These rivets also serve as anchor points for three flexible bands 50 of a rotary-to-axial motion conversion mechanism of this invention. Substantially L-shaped anchor plates 52 are provided between the bands 50 and the heads of rivets 48 to reinforce the bands at the point of attachment with rotor 36. Three such bands 50 are contemplated as a preferred arrangement, although more than three may be used if desired. Although thin flat elongated flexible bands have been shown in the preferred embodiment, it is contemplated that flexible wires or wire cables could also be used in certain embodiments. Flexible bands 50 extend leftward from rotor 36 to the base of a frusto-conical post or mandrel 54 which is positioned along the rotational axis of rotor 36 and axially displaced leftward of the transverse wall 36a. A bridge 56 is inserted within the opening 4c of housing 4 and is positioned within this opening by engagement of respective shoulders formed in the opening 4c of the housing 4 and on the bridge 56. Mandrel 54 has a threaded shank extending from its base which extends through an aperture in a left-hand transverse web of bridge 56 to receive a nut 58 thereon for fixedly securing the post or mandrel 54 within the interior chamber. Flexible bands 50 extend to the base of post 54 and are provided with an initial partial-turn wrap over the conical surface to thereby extend obliquely along that surface. The ends of flexible bands 50 are preferably attached directly to the surface of post 54 by brazing, welding or the like. Bridge 56 is firmly secured within the opening 4c by a nut 60 which is threadably received within the internally threaded bore 4c and which engages an annular flange 56b of bridge 56. A plurality of openings 56c are formed in the left-hand end of bridge 56 to provide fluid flow passage through the bridge.

An end cap 62 is threadably engaged within the left-hand opening 4c to close off the left-hand end of the device. A spacer ring 64 is disposed between an annular flange 62a of end cap 62 and the left-hand end of housing hub 4b. The respective junctures between spacer 64 and flange 62a and the end of hub 4b are sealed by providing annular welds thereat. End cap 62 has a cylindrical opening therethrough which is provided with a shoulder 62b against which a flow restrictor 66 is positioned. Flow restrictor 66 comprises a disc having a main central aperture 66a and a plurality of radially outboard located apertures 66b. A flexible slotted spring 66c overlies the left-hand surface of flow restrictor 66 to close off the openings 66b when a pressure differential exists at the opposite sides of flow restrictor 66 sufficient to deflect the spring 66c against the left-hand surface of the disc. As the pressure differential reduces, the spring returns to its normal shape and fluid flow is permitted through the outboard apertures as well as through the main central aperture 66a. A second filter assembly 68 is disposed within the interior opening of end cap 62 to bear against the left-hand peripheral surface of flow restrictor 66. An inlet tube 70 having an externally threaded right-hand end is threadably engaged within an internally threaded portion in the open left-hand end of end cap 62 to bear against the left-hand surface of filter 68, thereby maintaining filter 68 and flow restrictor 66 positioned against the internal annular shoulder in end cap 62. An annular spacer ring 72 is disposed over the inlet tube 70 to bear between the left-hand end of end cap 62 and an annular flange 70a of inlet tube 70. The respective junctures of flange 70a and spacer 72 and left-hand end of end cap 62 and spacer 72 are sealed by performing annular welds at these junctures.

Figure 8:
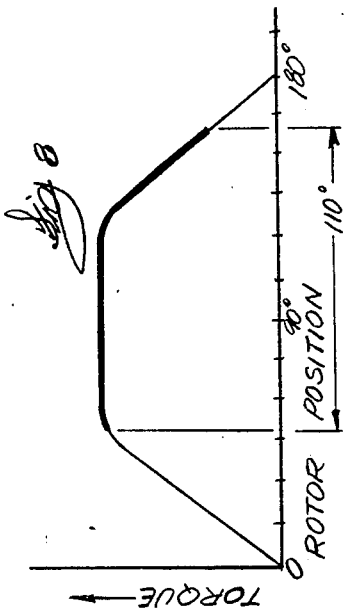
FIG. 8 is a torque/rotational position curve for a two pole brushless DC motor used in the device of this invention.

Right-hand end wall 4f is provided with a pair of stops 4s and 4t (FIG. 5) defining rotational positions of the rotor 36 which correspond to closed and full open positions, respectively, of the valve. Stops 4s and 4t define an arcuate travel distance of approximately 110° therebetween. A projection 36p is formed on the internal surface of the rotor 36 at the rear, or right-hand side thereof, for cooperative engagement with the stops. The stops and rotor position are selected with respect to the stator position such that the 110° travel of the rotor is derived during a maximum torque of the electrically energized motor as shown on the torque/rotational position of the rotor curve of FIG. 8. Hall effect transducers 35 and 37 are rotationally positioned within cavity 4e at positions indicated in FIG. 5 to provide signals of closed and full open positions of the valve based upon rotor position. Transducer 35 senses the magnetic field of permanent magnet 40 in the closed position shown in FIG. 5. Rotation of rotor 36 to the full open position moves permanent magnet 38 to a position adjacent transducer 37 whereupon that transducer senses the magnetic field of magnet 38.

Figure 9:
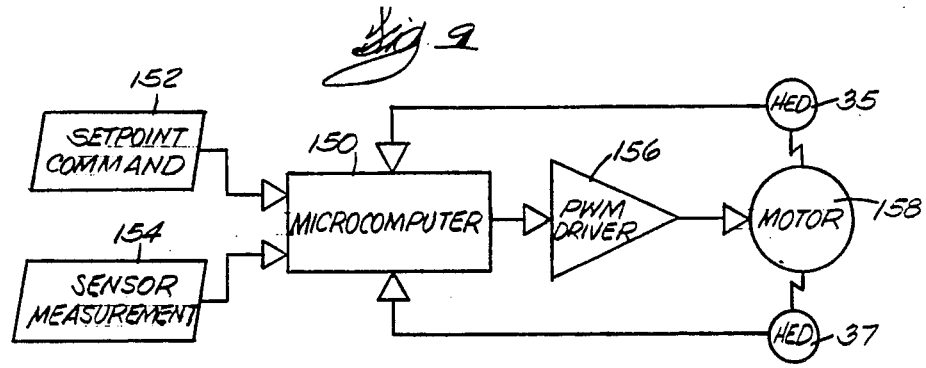
FIG. 9 is a schematic block diagram of an electronic control for the device of this invention.

The motor of the modulating valve fluid regulator described herein is preferably controlled by a microprocessor based electronic control system. FIG. 9 shows an exemplary control system, although various other systems may be used. Referring to FIG. 9, the system comprises a microcomputer 150 which receives a command signal from a command set point module 152 which may be an integral part of a larger computer system, or a separate setable device. Microcomputer 150 also receives input signals from one or more fluid condition monitoring transducers represented by the sensor measurement block 154. These transducers may monitor fluid temperature, pressure, flow rate, or the like. Signals from the Hall effect transducers 35 and 37 are also fed into microcomputer 150. The latter responds to these signals in a manner to be described hereinafter to provide a signal to a pulse width modulation driver 156 which is directly connected to the brushless DC motor 158 of the device 2. Pulse width modulation drive for the motor is preferred because it causes less self-heating of the motor, and provides quick response time.

Figure 10:
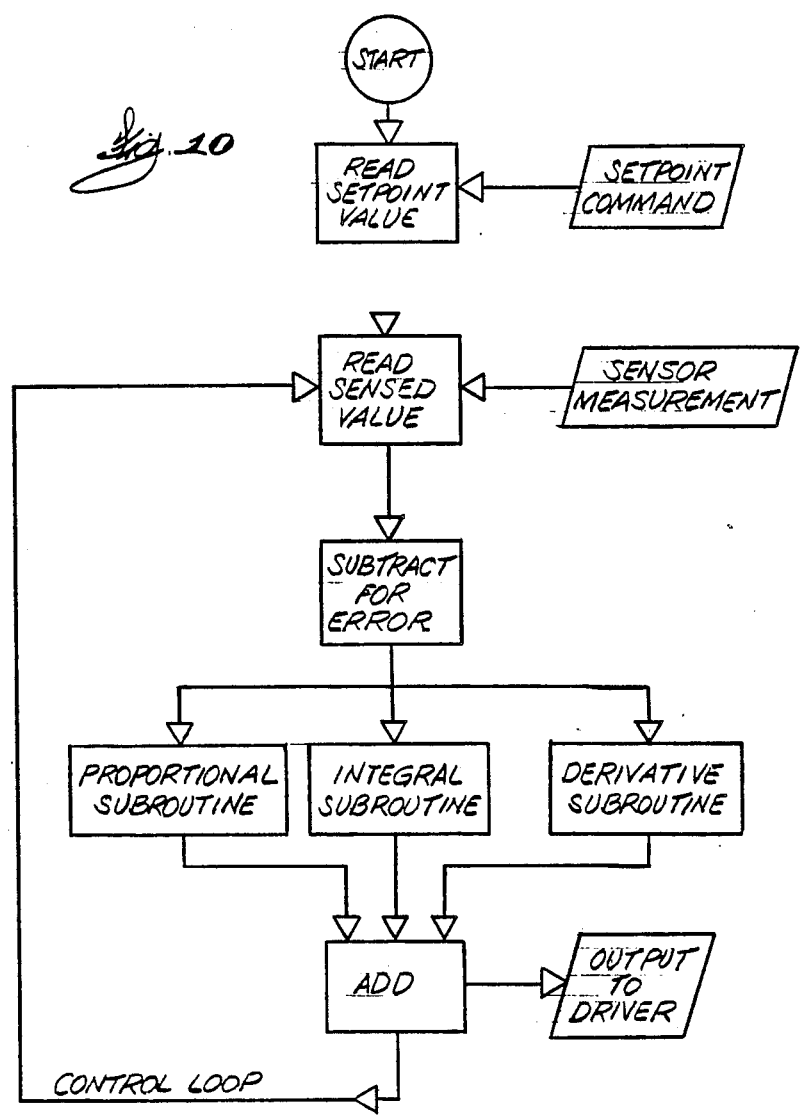
FIG. 10 is a flow chart for the microcomputer module of FIG. 9.

Referring additionally to FIG. 10, microcomputer 150 receives and reads the commanded set point value and the measurement values from the sensors. These values are subtracted to obtain an error value. Three subroutines then use this error value to derive a proportional output, an integral output and a derivative output (PID). The three outputs are subsequently combined to produce an output signal to the motor driver 156. The relative proportions of the three signals are fine tuned to produce a critically damped response of the controlled parameter. Driver 156 receives the control signal from microcomputer 150 and determines from the polarity thereof which direction to drive the motor, and from its amplitude, what duty cycle to apply to the pulse width. It then enables one pair or the other of an H-bridge solid state driver within the module at the pulse width modulation rate to drive the motor in either the valve opening or closing direction. The ability to power the motor in either direction significantly enhances the response time of the fluid control device.

The control system completes calculations quickly. It permits changing of set point values, changing the parameter to be controlled, changing PID gains to fine tune the response, or to add features such as "soft start" ramp up rates, alarms, overrides, and the like.

Upon appropriate energization of the stator windings 10, valve opening rotor movement is in a counterclockwise direction as viewed from the left-hand end of the device in FIG. 4. The initial pressure on valve poppet 44 along with the force derived from the permanent magnets and stator material tends to hold the valve closed. Counterclockwise rotation of the rotor causes the flexible bands 50 to further wind upon the conical surface of mandrel 54 to foreshorten their working length and pull the rotor leftward, thereby lifting the poppet 44 from the valve seat. With the valve open, axial fluid flow is permitted through the device, through the inlet tube 70, filter 68, flow restrictor 66, openings 56c in bridge 56, around bands 50, through openings 36d in wall 36a of rotor 36, outlet passage 20, filter 26 and outlet tube 30. The feedback signals provided to microcomputer 150 are processed within the controller and a signal is provided to the brushless DC motor from PWM driver 158 to rotate the rotor 36 either further counterclockwise to increase the valve opening or clockwise to reduce the valve opening as required, thereby to modulate the opening in response to changing set points or monitored fluid conditions.

An alternative embodiment of the fluid control device hereinabove described is shown in FIG. 6. This embodiment provides a limited number of transducers internally of the housing. The structural configuration of the housing and end cap assemblies are different from that hereinbefore described, but the two pole brushless DC motor, integrated rotor and regulator valve, bridge, mandrel and flexible band coupling means is the same as in the embodiment of FIGS. 1-5. Elements which correspond in function, but not necessarily structural shape, have been given a reference numeral corresponding to that of the embodiment described in FIGS. 1-5, but increased to a one hundred series. New elements are given new reference numerals.

In the embodiment of FIG. 6, a valve seat 114 is held within an opening in a right-hand end wall 104f of a housing 104 by a nut 118 threadably received within a threaded internal opening in the wall 104f. Valve seat 114 and nut 118 have central apertures therein which are aligned to form an outlet passage 120. The outlet passage is further defined by an axial opening 74a in a retainer member 74 which is threadably engaged with an internally threaded opening in the right-hand end of housing 104. Retainer 74 traps an interface plate or mounting flange 76 against the right-hand end wall surface of housing 104 by means of an annular flange 74b which is received within an enlarged cylindrical opening in flange 76 providing an annular shoulder in that flange. Housing 104 is provided with openings 104m and 104n adjacent its right-hand end thereof, the openings extending radially inwardly toward the axis of the device. A temperature sensing transducer 78 is affixed within opening 104m and a pressure sensing transducer 80 is affixed within opening 104n. Transducers 78 and 80 project inwardly such that the inner sensing ends of the transducers are positioned adjacent the outlet passage 120/74a. The electrical wire connections from the transducers 78 and 80 are extended through an appropriate wiring space provided between housing 104 and an external cover portion 104p to a connector module 134 affixed to a lower boss 104j of the housing. Accordingly, the pressure and temperature of the fluid may be monitored immediately within the outlet passage of the fluid control device. This is particularly useful where the device is intended to be mounted directly against apparatus which does not have access for locating transducers therein.

Figure 7:
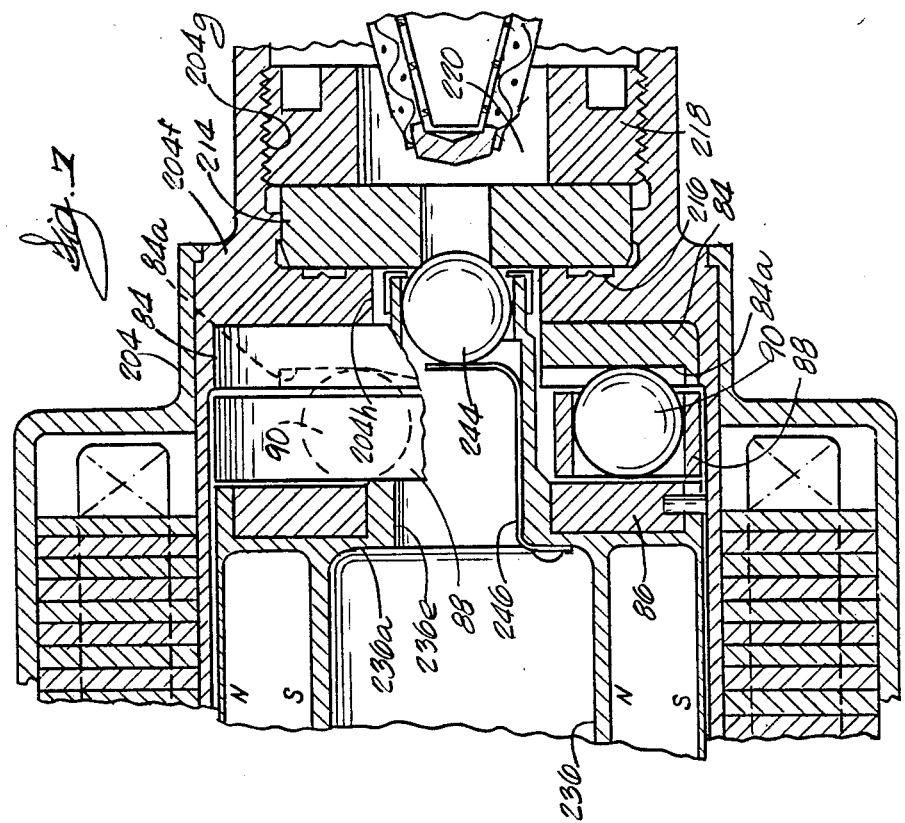
FIG. 7 is a fragmentary cross sectional view of another alternative embodiment of the fluid control device of this invention.

Another alternative embodiment of the fluid control device of this invention is shown in FIG. 7. This embodiment utilizes a ball bearing drive in place of the rotary to axial flexure drive hereinbefore described to provide a variable lead characteristic ("lead" is customarily expressed as the axial motion per revolution) as a function of poppet position. In many system applications, including pressure regulation of a high pressure gas supply tank that blows down at a lower pressure, the fluid control device is only required to open slightly at the maximum inlet pressure and opens progressively further only as the supply pressure blows down (reduces). In such systems it is advantageous to provide a lower lead (e.g., higher mechanical advantage) near the closed, maximum pressure, position to minimize the peak torque that must be generated by the motor, and then to gradually increase the lead (e.g. reduce the mechanical advantage) and hence increase the rate of poppet opening motion as the motor rotates open. Such a variable lead drive serves to reduce the motor size, weight and power. Analysis of a typical pressure blow down application shows that motor size and weight is only 40% of that required for a constant lead drive. It is noted that although the aforementioned rotary to axial flexure drive has an essentially constant lead characteristic, it does exhibit some lead variation in the desired manner. In connection with FIG. 7, reference numerals of elements corresponding to those previously described in the earlier embodiments are given a 200 series numeral.

A housing 204 has a right-hand end wall 204f having an internally threaded opening 204g and a central aperture 204h. A valve seat 214 is disposed within a reduced diameter opening in end wall 204f against a transverse surface of that end wall. A seal 216 is disposed between valve seat 214 and end wall 204f. Valve seat 214 is held in place against end wall 204f by a nut 218 threadably received within the opening 204g. Central apertures in valve seat 214 and nut 218 form an outlet passage 220. The left-hand surface of end wall 204f is provided with a bearing race 84 which preferably has three cam surfaces 84a formed on the left-hand face thereof (only two of which are shown in FIG. 7). Surfaces 84a are spaced at 120° intervals. These surfaces may be linear ramps, but preferably are arcuate, increasing in slope in the valve opening direction of rotation of rotor 236. A flat surfaced bearing race 86 is provided on the right-hand face of transverse wall 236a of rotor 236. Wall 236a projects rightwardly to define a central aperture 236c for retaining a poppet 244 in position over valve seat 214. The right-hand end of the projection of wall 236a is provided with a constriction to retain poppet 244 within the aperture 236c. A spring 246 is affixed to the wall 236a, extends within the aperture 236c and bears against the left-hand side of poppet 244 to provide a bias to the poppet against valve seat 214. A circular ball cage 88 having three ball bearings 90 spaced at 120° intervals is disposed between bearing races 84 and 86. The upper portion of bearing race 84 and ball cage 88 are shown in elevation to more clearly illustrate the arcuate shape of cam surface 84a. In operation, rotation of rotor 236 in a clockwise direction as viewed from the left-hand end of FIG. 7 causes balls 90 to roll upwardly along the incline of cam surface 84a. The initial movement of the bearings 90 is along a relatively shallow slope portion of the cam surface to maximize the torque for lifting the poppet 244 from valve seat 214, thereby opening the outlet passage 220. The slope of cam 84a increases in the clockwise rotational direction such that greater lift is provided as the poppet pressure unbalance decreases as the valve opens. It is to be understood that the bearing races 84 and 86 could be positionally interchanged without affecting the operation of this embodiment. Although this embodiment does provide improved utilization of torque, it has the disadvantage over the earlier described embodiments of requiring unlubricated bearings.

As described hereinabove, the fluid control device is a cylindrical device having major housing components assembled by threaded connections with annular spacer rings 24, 32, 64 and 72 disposed between the housing components. The junctures of the spacer rings and the respective housing components are sealed by annular welds at the respective adjoining faces. In previous devices wherein spacer rings are not provided, the adjoining faces of the housing components are directly welded by an annular weld. It is occasionally necessary to disassemble a fluid control device to make repairs to internal components. To do this, the welded joint is machined away along one of the components, and that component subsequently scrapped because of the removed material. The face of the other component is cleaned, resurfaced and is therefore reusable. The spacer rings provided in this invention are intentionally sacrificial, permitting the machining operation to be made on the spacer and the adjacent surfaces of both components resurfaced to minimize scrap.

In FIG. 11, a fragmentary portion of right-hand end cap 22 of the fluid control device of FIGS. 1–5 is shown in cross section. Outlet tube 30 is assembled thereto by the threaded connection with spacer ring 32 interposed the right-hand end face of end cap 22 and the flange 30a of outlet tube 30. To separate the outlet tube 30 from end cap 22, an annular cut 32a is made through spacer ring 32 to the annular surface of tube 30. The latter may then be unthreaded from end cap 22 to separate the two components as shown in FIGS. 12 and 13. Part of the spacer 32b remains welded to the right-hand face of end cap 22, and another part 32c remains welded to the flange 30a of outlet tube 30. Once separated suitable machining operations may be performed on both components to remove the spacer material, thereby reconditioning the faces for subsequent reassembly with a new spacer ring and new annular welds at the respective junctures.

The foregoing has described several embodiments of an improved fluid control device. It is to be understood that this device is susceptible of further modification without departing from the scope of the appended claims.

We claim:

1. A fluid control device comprising:
    a housing having an inlet passage, an interior chamber communicating with said inlet passage, an outlet passage leading from said interior chamber, and a valve seat disposed in said outlet passage;
    a brushless DC motor in said housing having a rotor supported in said interior chamber, bearing means providing for free rotary movement of said rotor and for free axial sliding movement independent of said rotary movement of said rotor in said chamber, openings in said rotor permitting fluid passage therethrough, said rotor carrying a poppet closing off said outlet passage from said interior chamber in a de-energized condition of said motor; and
    intercooperating cam means comprising ramp means on either said housing or said rotor and ball bearing cam followers disposed in mutual engagement between said ramp means and a surface on the other of said housing or said rotor, said ramp means having a progressively increasing slope effecting variable axial translation relative to constant rotation of said rotor for moving said poppet away from said valve seat.

* * * * *